(12) United States Patent
Brouwer et al.

(10) Patent No.: US 8,201,799 B2
(45) Date of Patent: Jun. 19, 2012

(54) COMPOSITION OF PARTICLES FOR DAMPING VIBRATIONS, METHOD FOR ASSEMBLING A MIRROR ADJUSTMENT MECHANISM, AND MIRROR ADJUSTMENT MECHANISM

(75) Inventors: Stefan Frits Brouwer, Schoonhoven (NL); Marius Brand, Amerspoort (NL); Rudolf Pieter Hoogenboom, Amersfoort (NL)

(73) Assignee: MCi (Mirror Controls International) Netherlands B.V., Montfoort (NL)

(*) Notice: Subject to any disclaimer, the term of this patent is extended or adjusted under 35 U.S.C. 154(b) by 988 days.

(21) Appl. No.: 10/599,650

(22) PCT Filed: Apr. 4, 2005

(86) PCT No.: PCT/NL2005/000241
§ 371 (c)(1),
(2), (4) Date: Aug. 4, 2009

(87) PCT Pub. No.: WO2005/108169
PCT Pub. Date: Nov. 17, 2005

(65) Prior Publication Data
US 2009/0293665 A1    Dec. 3, 2009

(30) Foreign Application Priority Data
Apr. 5, 2004 (NL) ...................................... 1025884

(51) Int. Cl.
*A47G 1/24* (2006.01)
(52) U.S. Cl. ......... 248/476; 248/636; 248/479; 359/672
(58) Field of Classification Search .................. 248/636, 248/466, 476, 479, 481; 359/871, 872
See application file for complete search history.

(56) References Cited

U.S. PATENT DOCUMENTS

| | | | | |
|---|---|---|---|---|
| 4,171,873 A * | 10/1979 | Repay et al. | ................... | 359/874 |
| 2003/0152857 A1* | 8/2003 | Sugiura et al. | ............. | 430/109.2 |
| 2005/0032469 A1* | 2/2005 | Duescher | ...................... | 451/548 |
| 2007/0183068 A1* | 8/2007 | Kozlowski | .................... | 359/877 |
| 2007/0256597 A1* | 11/2007 | Rukavina et al. | ........ | 106/287.25 |
| 2010/0152346 A1* | 6/2010 | Yang et al. | .................... | 524/145 |
| 2010/0255317 A1* | 10/2010 | Saito et al. | ................. | 428/425.5 |
| 2011/0222176 A1* | 9/2011 | Browne et al. | ................. | 359/846 |
| 2012/0014008 A1* | 1/2012 | Snegg | ........................... | 359/872 |
| 2012/0033314 A1* | 2/2012 | Szmolenszki et al. | ........ | 359/872 |

OTHER PUBLICATIONS

International Preliminary Examination Report for App. No. PCT/NL2005/000241 Mailed Oct. 19, 2006.
International Search Report for App. No. PCT/NC2005/00241 Mailed Jun. 27, 2005.

* cited by examiner

*Primary Examiner* — Ramon Ramirez
(74) *Attorney, Agent, or Firm* — Dykema Gossett PLLC

(57) ABSTRACT

A composition comprising particles for damping vibrations performed by cooperating surfaces of a mirror adjustment mechanism relative to each other. The cooperating surfaces adjustably connect a mirror holder for supporting the mirror element with a base plate that can be fixedly mounted to a motor vehicle. In an embodiment, the particles positioned close to one of the surfaces are arranged to move to a lesser extent relative to that surface upon a high-frequency pivoting of the cooperating surfaces than particles that are further removed from that surface. A method for assembling a mirror adjustment mechanism for adjusting a mirror element of a mirror unit of a motor vehicle mirror and an adjustment mechanism for adjusting a mirror element of a mirror unit are also disclosed.

40 Claims, 2 Drawing Sheets

COMPOSITION OF PARTICLES FOR DAMPING VIBRATIONS, METHOD FOR ASSEMBLING A MIRROR ADJUSTMENT MECHANISM, AND MIRROR ADJUSTMENT MECHANISM

This application is a continuation of International PCT Application No. PCT/NL2005/000241, with an international filing date of Apr. 4, 2005, which claims the benefit of priority to Netherlands Application No. 1025884, filed Apr. 5, 2004, each of which applications are fully incorporated herein by reference.

TECHNICAL FIELD

The invention relates to a mirror adjustment mechanism for adjusting a mirror element of a mirror unit of a motor vehicle.

BACKGROUND AND SUMMARY

Mirror adjustment mechanisms are known, for instance, from the Dutch patent publication NL 1015428, where a mirror adjustment mechanism is used to adjust a mirror element in a mirror housing of a motor vehicle. Moreover, the angular position of a mirror element can be varied with respect to a frame that is mounted to the mirror housing, such that a driver of the motor vehicle has an optimum field of vision in rearward direction. Also, mirror adjustment mechanisms can be used to adjust the mirror housing inclusive of the mirror element relative to a base plate that is fixedly mounted on the motor vehicle.

At relatively high speeds of the motor vehicle, or when driving over a road having a rough surface, such as an unimproved road, the mirror element may start to vibrate under the influence of forces exerted by the air flowing past, or as a result of forces transmitted to the mirror housing via the wheels. The cooperating surfaces of the mirror adjustment mechanism then perform vibrations relative to each other. More particularly, the cooperating surfaces alternately move away from and towards each other, or along each other in a direction substantially parallel to one of the cooperating surfaces. Also, a combination of the above-mentioned movements is possible. The vibration of the mirror element adversely affects the driver's view in rearward direction, which is undesired, for instance for reasons of safety.

There are different mechanical constructions known which envisage a vibration-absorbing effect, such as hydraulic or pneumatic shock absorbers and shock damping actuators. Often, however, these are costly, non-compact and less reliable constructions.

An object of the invention is to obtain a mirror adjustment mechanism of the type in which vibrations are prevented. More particularly, an embodiment of the invention contemplates a mirror adjustment mechanism in which vibrations performed by the cooperating surfaces of the mirror adjustment mechanism relative to each other are damped. To that end, a metal salt of a fatty acid may be used.

Surprisingly, it has been found that through the use of such metal salts, the cooperating surfaces of the mirror adjustment mechanism vibrate less at relatively high speeds of the motor vehicle or when driving over a road having a rough surface. The metal salt of a fatty acid, also designated as "fatty acid salt" or "metal soap," has a lubricating action in low-frequency pivotal motions, while at higher frequencies, a vibration-absorbing action is involved. This effect can be ascribed to the energy absorption that occurs in the metal salt possibly behaving as a fluid. It supposed that upon a high-frequency pivoting of the cooperating surfaces, metal salt particles situated close to one of the surfaces move to a lesser extent relative to that surface than metal salt particles that are further removed from that surface. The friction thereby arising could prevent the unwanted pivotal motion. According to another supporting explanation, the vibration-absorbing effect is obtained in that particles of the metal salt like ball bearings behave as a lubricant at relatively low frequencies, while at relatively high frequencies, by contrast, friction arises between the particles of metal salt and the cooperating surfaces.

Metal soaps are generally known to be applicable as grease, lubricant, anticlotting agent, tabletting aid, hydrophobing agent, separating agent, chemical stabilizer, defoamer and/or detaching agent.

The metal in the metal salt of a fatty acid can be any suitable metal, such as an alkali or alkaline-earth metal, or other metal. Suitable metals are, inter alia, magnesium, calcium, aluminum, zinc, lead, sodium, potassium, barium, lithium, copper, tin, iron, chromium or zirconium. Preferably, the metal is magnesium, calcium, aluminum or zinc, more preferably zinc.

The fatty acid in the metal salt of a fatty acid can be a natural or synthetic fatty acid. Natural fatty acids can be obtained from vegetable or animal sources in manners well known in the art, and such sources include, but are not limited to, vegetable oils, nut oils and seed oils, such as almond oil, castor oil, coconut oil, corn oil, cottonseed oil, jojoba oil, linseed oil, grapeseed oil, rapeseed oil, mustard oil, olive oil, palm oil and palm kernel oil, peanut oil, safflower oil, sesame oil, soybean oil, sunflower oil, crambe oil, wheat germ oil, and cocoa butter; and animal oils and fats, such as lanoline, chicken fat, tallow, lard, beef fat, butterfat, mink oil, and fish oils.

The fatty acids can be fatty acids having a saturated, unsaturated, unbranched or branched chain. Very suitable fatty acids are the following higher fatty acids (C6-C24), specified by the standard chemical name, along with the common name, the number of carbon atoms and the number of double bonds in the fatty acid chain: hexanoic acid (caproic acid; C6:0); heptanoic acid (C7:0); octanoic acid (caprylic acid; C8:0); nonanoic acid (pelargonic acid; C9:0); decanoic acid (capric acid; C10:0); undecanoic acid (C11:0); undecylenic acid (C11:1); dodecanoic acid (lauric acid; C12:0); tridecanoic acid (C13:0); tetradecanoic acid (myristic acid; C14:0); tetradecenoic acid (myristoleic acid; C14:1); pentadecanoic acid (C15:0); pentadecenoic acid (C15:1); hexadecanoic acid (palmitic acid; C16:0); hexadecenoic acid (palmitoleic acid; C16:1); hexadecadienoic acid (C16:2); hexadecatrienoic acid (C16:3); heptadecanoic acid (margaric acid; C17:0); heptadecenoic acid (margaroleic acid; C17:1); octadecanoic acid (stearic acid; C18:0); 9-octadecynoic acid (stearolic acid; C18:1); [Z]-9-octadecenoic acid (oleic acid; C18:1); [E]-9-octadecenoic acid (elaidic acid; C18:1); [R-[Z]]-12-hydroxy-9-octadecenoic acid (ricinoleic acid; C18:1); [Z,Z]-9,12-octadecadienoic acid (linoleic acid; C18:2); [Z,Z,Z]-9,12,15-octadecatrienoic acid (linolenic acid; C18:3); octadecatetraenoic acid (C18:4); nonadecanoic acid (C19:0); eicosanoic acid (arachidic acid; C20:0); [Z]-9-eicosenoic acid (gadoleic acid; C20:1); eicosadienoic acid (C20:2); eicosatrienoic acid (C20:3); [all-Z]-5,8,11,14-eicosatetraenoic acid (arachidonic acid; C20:4); eicosapentaenoic acid (C20:5); docosanoic acid (behenic acid; C22:0); (Z)-13-docosenoic acid (erucic acid; C22:1); docosadienoic acid (cetoleic acid; C22:2); docosatrienoic acid (C22:3); docosatetraenoic acid (C22:4); docosapentaenoic acid (C22:5); docosahexaenoic acid (C22:6); tetracosanoic acid (lignoceric acid;

C24:0); tetracosenoic acid (C24:1); and/or stereoisomers thereof; and/or derivatives thereof, such as for instance hydroxystearic acid; and/or branched chain derivatives thereof, such as for instance isostearic acid.

Derivatives of fatty acids that can be used in embodiments of the invention comprise fatty acids that are substituted with alkyl, aryl, acyl, heteroaryl, halogen, hydroxy or alkoxy.

The term "alkyl", or "alk" (i.e., derivative forms of alkyl, as in, for instance, "alkoxy") refers to optionally substituted straight chain or cyclic monovalent alkane (saturated hydrocarbon)-derived radicals containing 1 to 12 carbon atoms. If substituted, alkyl groups may be substituted with up to 4 substituent groups at any available binding position. Examples of alkyl groups comprise, but are not limited to, methyl, ethyl, propyl, isopropyl, n-butyl, t-butyl, isobutyl, pentyl, hexyl, isohexyl, heptyl, octyl, nonyl, decyl, undecyl, dodecyl and the like. The alkyl may be optionally substituted with one or more halogens.

The term "aryl", or derivative forms thereof, refers to monocyclic or bicyclic aromatic rings, e.g., phenyl, substituted phenyl and the like, as well as groups which have fused, e.g. naphthyl, phenanthrenyl and the like, containing from 6 to 30 carbon atoms. Accordingly, an aryl group can contain at least one ring with 6 atoms, while up to 5 of such rings can be present, having therein 22 or 30 atoms, depending on optionally alternating (resonating) double bonds between carbon atoms or suitable hetero atoms. Examples of aryl groups comprise, but are not limited to, phenyl, naphthyl, anthryl, biphenyl and the like.

The term "acyl" refers to the radical RCO$^-$, alone or in combination, for instance with oxygen, nitrogen, sulfur, etc.

The term "heteroaryl" refers to a monocyclic aromatic hydrocarbon group having 5 or 6 ring atoms, or a bicyclic aromatic group having 8 to 10 atoms, containing at least one hetero atom, O, S or N, in which a carbon or nitrogen atom is the point of attachment, and in which one or two additional carbon atoms are optionally substituted by a hetero atom selected from O or S, and in which from 1 to 3 additional carbon atoms are optionally replaced by nitrogen hetero atoms, the heteroaryl group mentioned being optionally substituted as described herein. Examples of heteroaryl groups comprise, but are not limited to, thienyl, furyl, pyrrolyl, pyridinyl, imidazolyl, pyrrolidinyl, piperidinyl, thiazolyl, oxazolyl, triazolyl, pyrazolyl, isoxazolyl, isothiazolyl, pyrazinyl, pyridazinyl, pyrimidinal, triazinylazepinyl, indolyl, isoindolyl, quinolinyl, isoquinolinyl, benzothiazolyl, benzoxazolyl, benzimidazolyl, benzoxadiazolyl, benzofurazanyl, etc. The heteroaryl groups can be optionally substituted by one or more groups which comprise, but which are not limited to, halogen, alkyl, alkoxy, hydroxy, carboxy, carbamoyl, alkyloxycarbonyl, trifluoromethyl, cycloalkyl, nitro, cyano, amino, alkyl-S(O)$_m$ (wherein m=0, 1 or 2), thiol and the like.

The term "halogen" or "halo" refers to chlorine, bromine, fluorine or iodine, the preferred halogen being bromine.

Preferably, the fatty acid in the metal salt of a fatty acid is selected from the group consisting of C8-C24 fatty acids, more preferably from the group consisting of C14-C22 fatty acids. Still more preferably, unbranched, naturally occurring fatty acids having between 14 and 22 carbon atoms are used. Particularly preferred are the C16-C20 fatty acids which can be obtained from tallow, the most preferred fatty acid being stearic acid.

The metal salt of a fatty acid can be obtained in any known manner. Thus, for instance, very suitably, an oil or fat as a source of a fatty acid can be saponified with a metal hydroxide, whereby the ester bonds are hydrolyzed and the fatty acids are split off from the glycerol backbone. The skilled person is familiar with the methods that can be used for that purpose. Thus, for instance, a metal salt of a fatty acid can be prepared from tallow, an animal fat having a melting point above 40° C. which consists substantially of completely esterified fatty acid-glycerol esters, by saponifying the tallow in water with an alkaline solution of a metal hydroxide, optionally followed by salting out the excess alkali and separating the soap from the glycerol to obtain the metal salt of a fatty acid. In this way, mixtures of fatty acid salts are obtained, which can also find application in embodiments of the invention. Mixtures of fatty acid salts where, as metal of the metal salt, sodium or potassium is used are generally called soap.

Suitable metal salts of a fatty acid are also commercially available, inter alia from Peter Greven Fett-Chemie, Münstereifel, Germany and from AKM, forming part of Safic Alcom, Malford Court, Hardwick Grange, Warrington, United Kingdom.

The metal salt of a fatty acid can in principle be used in any form, but is preferably used in the form of a powder.

The most preferred metal salt of a fatty acid that is used in aspects of the present invention is zinc stearate (octadecanoic acid) also known by the name of talculin Z (CAS No.: 557-05-1), preferably in powder form.

By using a metal salt of a fatty acid which adheres to the cooperating surfaces of the mirror adjustment mechanism, such as, for instance, an organophilic substance when plastic surfaces are used, what is achieved is that molecules situated close to one of the cooperating surfaces are relatively difficult to displace relative to that surface. This enhances the occurring friction at high frequencies, so that absorption improves as well. Moreover, once applied, the substance remains better present at the desired location, viz. the cooperating surfaces.

Preferably, the metal salt is hydrophobic, so that the mirror adjustment mechanism continues to function in case of frost as well, while preventing rust on metal parts near the mechanism.

Advantageously, the substance can be applied in powder form on at least one of the cooperating surfaces. The substance is preferably applied directly onto the surfaces, for instance by spraying or by atomization. It is also possible, however, to apply the substance onto neighboring parts of the mirror adjustment mechanism. In some way or other, amounts of such applied substance can subsequently end up on the above-mentioned surfaces as well, for instance through shifting or atomization.

The invention further relates to a method for assembling a mirror adjustment mechanism.

The invention also relates to the use of a metal salt of a fatty acid.

Further advantageous embodiments of the invention are embodied by the claims.

BRIEF DESCRIPTION OF THE DRAWINGS

The invention will be further elucidated with reference to exemplary embodiments which are represented in the drawing. In the drawing.

The figures are only schematic representations of embodiments of the invention. In the figures, the same or corresponding parts are indicated by the same reference numerals.

DETAILED DESCRIPTION

Figure 1:
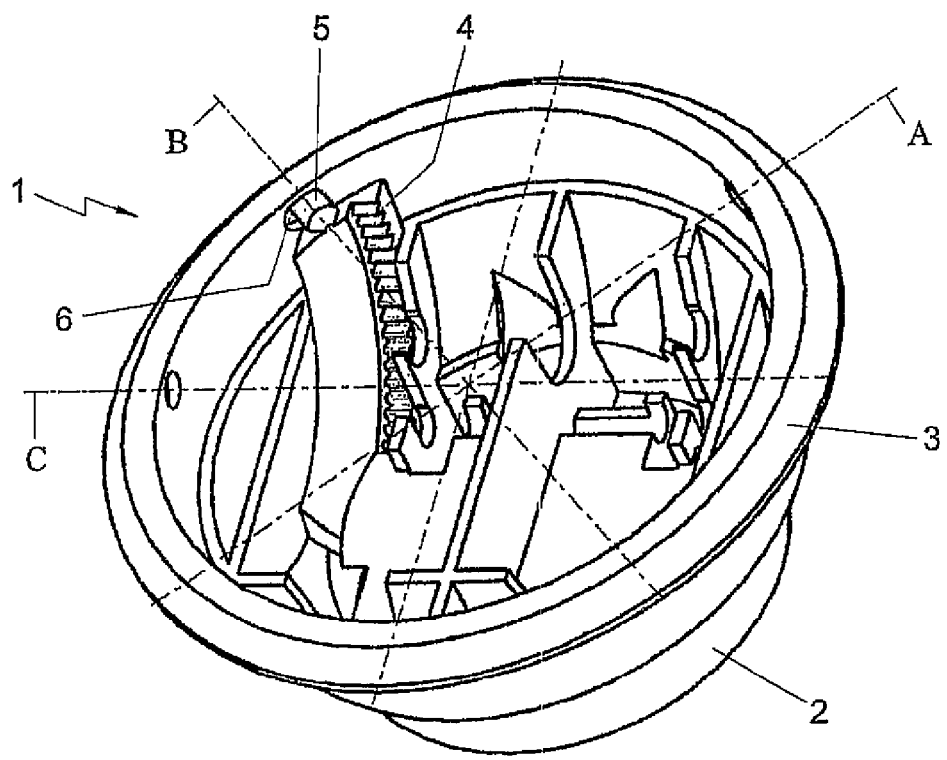
FIG. 1 shows a perspective schematic view of a mirror adjustment mechanism according to an embodiment of the invention.
Figure 2:
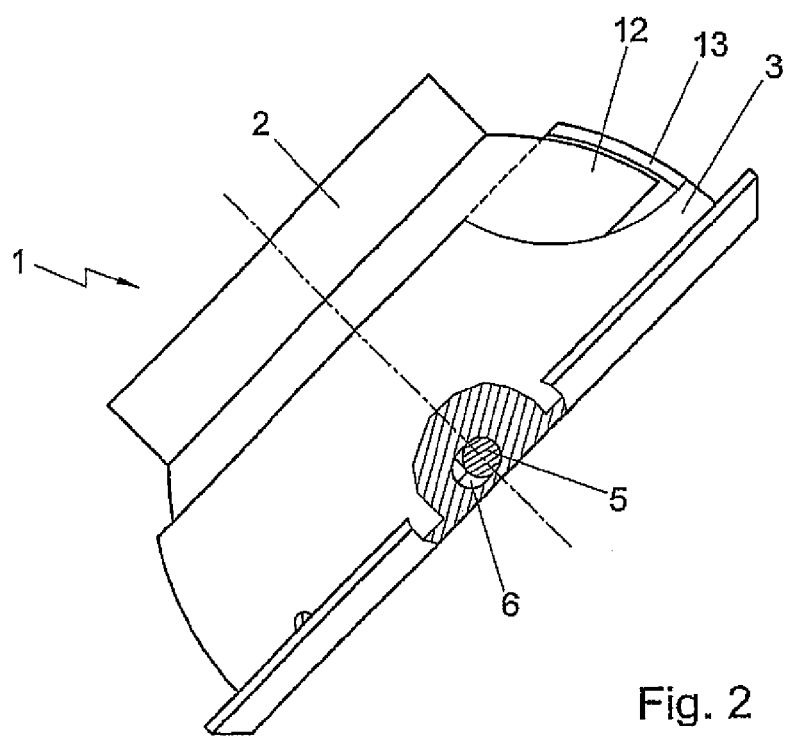
FIG. 2 shows a schematic side view of a partly cutaway mirror adjustment mechanism of FIG. 1.

FIGS. 1 and 2 represent an embodiment of a mirror adjustment mechanism 1 for adjusting a mirror element of a wing mirror unit of a motor vehicle according to an embodiment of the invention. In the illustrated embodiment, the mirror adjustment mechanism 1 comprises a substantially spherically curved holder 2 which constitutes a first hinge part, and a substantially spherically curved ring 3 which constitutes a second hinge part of the mirror adjustment mechanism 1. The holder 2 is supported by a mirror housing (not shown). The ring 3 serves as mirror holder and is arranged for supporting a mirror element (not shown either), for instance with the aid of a mirror supporting plate which is attached to the ring 3, for instance via a snap connection. By means of a second hinge mechanism, the frame is attached to a base plate which can be fixedly mounted to the motor vehicle.

By adjusting the ring 3 relative to the holder 2, the mirror element can be adjusted, so that a driver's view rearwards of the motor vehicle can be set optimally. In the embodiment shown, adjustment of the ring 3 and the holder 2 occurs through a hinging movement. Hinging the ring 3 relative to the holder 2 is done by pivoting cooperating surfaces. More particularly, a part 12 of the outer surface of the holder 2 cooperates with a part 13 of the inner surface of the ring 3, as shown in FIG. 2. As the holder 2 is being pivoted relative to the ring 3, the cooperating surfaces 12, 13 slide along each other, so that the ring 3 can rotate relative to the holder 2.

On at least one of the mutually facing cooperating surfaces 12, 13, zinc stearate in the form of a powder has been applied, so that vibrating movements performed by the cooperating surfaces 12, 13 relative to each other, are damped. This prevents vibration of the mirror element relative to the frame and the base plate at high speed or in case of a rough road surface. Generally, the zinc stearate functions as vibration damper from a frequency of approximately 40 Hz, as with vibrations of a frequency around 100 Hz. A powder is herein defined as a substance of ground, pulverized or otherwise finely divided solid particles of a grain size between 1 and 100 micrometers, preferably of a grain size of less than 75 micrometers, still more preferably of less than 45 micrometers. To be used, for instance, is zinc stearate ($Zn(C_{15}H_{35}O_2)_2$) with zinc (typically 10.8%) and ash (13.5%), having a volatility of 0.2% at a temperature of 105° C., having a melting point of 119° C., and to which a high content of organic material has been added.

The substantially spherical holder 2 is hingeable relative to the substantially cup-shaped ring 3 about a first axis A, which is situated in a plane which is substantially parallel with the top surface of the holder 2. Further, the mirror adjustment mechanism 1 comprises driving means which are present to enable the holder 2 to be pivoted relative to the ring 3. These driving means comprise a non-straight driving rod 4, bearing mounted in the holder 2, as well as means for activating the driving rod 4. The driving rod 4 has the shape of a ring segment which is rotatable relative to an axis C. This axis C is at an angle of 45° with respect to the axis A. The ring segment is provided with teeth which are in mesh with the teeth of an output gear wheel of a driving system. This driving system comprises a motor and an associated drive train; for the sake of simplicity, however, these components are not shown. By energizing the motor, and through the intermediacy of the drive train, the gearwheel is driven, resulting in displacement of the ring segment in the holder 2. As the driving rod 4 is connected with a driving part 5 which is mounted in a recess 6 in the ring 3 so as to be rotatable relative to an axis B which is perpendicular to the axis A, a displacement of the driving rod 4 in the holder 2 means that the driving part 5 moves the ring 3 relative to the holder 2. The driving part 5 is here designed as a cylinder-shaped element. For more details, reference is made to the Dutch patent publication NL 1015428.

Further, the zinc stearate can be applied to at least one of the cooperating surfaces of, on the one hand, the teeth of the ring segment and, on the other hand, the output gear wheel of the driving system, or to cooperating parts in the drive train. This also prevents the occurrence of vibrations of the mirror element relative to the frame and the base plate. The cooperating parts connect the ring 3 with the base plate indirectly. However, a direct connection is also possible, as appears from FIG. 3.

Figure 3:
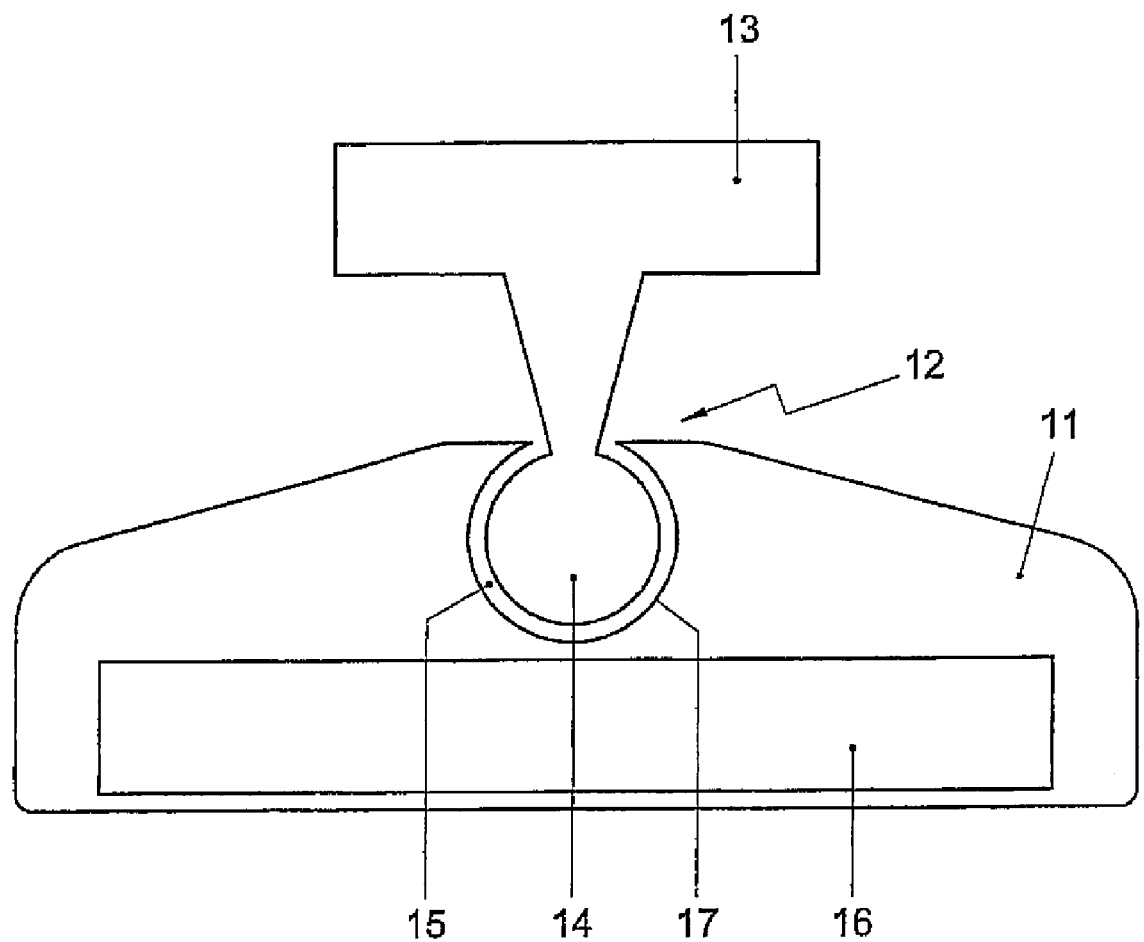
FIG. 3 shows a schematic side view of another mirror adjustment mechanism according to an embodiment of the invention.

FIG. 3 shows a second embodiment of a mirror adjustment mechanism 1 designed as an inside rearview mirror unit for a motor vehicle, where the mirror holder 11 is directly hinged to the base plate 13 via a ball hinge 12, without intermediacy of a second hinge mechanism. The mirror holder 11 supports a mirror glass 16. The ball hinge 12 comprises a ball-shaped body 14 which is fixedly connected with the base plate 13 and which is situated in a cavity 17 in the mirror holder 11. In the space 15 between the ball 14 and the wall of the cavity 17, the zinc stearate has been applied.

The invention is not limited to the exemplary embodiments described here. Many variants are possible.

Thus, the orientation of the driving rod is not necessarily chosen as shown in FIG. 1, but can for instance be chosen such that the driving rod can move in a plane perpendicular to the axis A. In addition, the driving rod can be of a different shape, for instance substantially straight, with a terminal end engaging a point on the mirror supporting plate.

Also, an entirely different drive of the mirror adjustment mechanism can be implemented. Nor, even, is it necessary to realize a motor-drive. By omitting the drive, an adjusting mechanism to be adjusted manually is obtained.

The substantially spherically curved ring can also be designed as a substantially spherically curved cup, as, for instance, in the mirror adjustment mechanism described in the Dutch patent publication NL 1012087. Also, the mirror adjustment mechanism can comprise cooperating dish parts of which cooperating surfaces can adjust the mirror element relative to the base plate, As appears from the second exemplary embodiment, the mirror adjustment mechanism can also comprise a ball hinge.

Further, the metal salt of a fatty acid can be used in the second hinge mechanism, so that the frame pivots relative to the base plate which is mounted to the motor vehicle.

Such variants will be clear to those skilled in the art and are understood to fall within the scope of the invention as set forth in the following claims.

We claim:
1. A composition comprising particles for damping vibrations performed by cooperating surfaces of a mirror adjustment mechanism relative to each other, wherein said cooperating surfaces adjustably connect a mirror holder for supporting the mirror element with a base plate that can be fixedly mounted to a motor vehicle; and wherein the particles positioned close to one of the surfaces are arranged to move to a lesser extent relative to that surface upon a high-frequency pivoting of the cooperating surfaces than particles that are further removed from that surface.

2. The composition of claim 1, wherein the particles are arranged to generate friction between the particles and the cooperating surfaces upon a high-frequency pivoting of the cooperating surfaces.

3. The composition of claim 1, wherein the composition comprises a metal salt of a fatty acid.

4. The composition according to claim 3, wherein the metal salt of a fatty acid comprises a C6-C24 fatty acid.

5. The composition according to claim 3, wherein the metal salt of a fatty acid comprises a C8-C24 fatty acid.

6. The composition according to claim 3, wherein the metal salt of a fatty acid comprises a C14-C22 fatty acid.

7. The composition according to claim 3, wherein the metal salt of a fatty acid comprises a C16-C20 fatty acid, a derivative thereof, or both a C16-C20 fatty acid and a derivative thereof.

8. The composition according to claim 3, wherein the fatty acid has been obtained from tallow.

9. The composition according to claim 3, wherein the metal salt of a fatty acid comprises a metal selected from the group consisting of magnesium, calcium, aluminum, and zinc.

10. The composition according to claim 3, wherein the metal salt of a fatty acid comprises zinc palmitate, zinc stearate, zinc oleate, or combinations of two or more of the foregoing.

11. The composition according to claim 3, wherein the metal salt of a fatty acid is zinc stearate.

12. The composition according to claim 3, wherein the metal salt of a fatty acid is used in the form of a powder.

13. The composition according to claim 3, wherein the metal salt adheres to the cooperating surfaces of the mirror adjustment mechanism.

14. The composition according to claim 3, wherein the metal salt is hydrophobic.

15. A composition comprising particles for damping vibrations performed by cooperating surfaces of a mirror adjustment mechanism relative to each other, wherein said cooperating surfaces adjustably connect a mirror holder for supporting the mirror element with a base plate that can be fixedly mounted to a motor vehicle; and wherein the particles are arranged to generate friction between the particles and the cooperating surfaces upon a high-frequency pivoting of the cooperating surfaces.

16. The composition of claim 15, wherein the composition comprises a metal salt of a fatty acid.

17. A method for assembling a mirror adjustment mechanism for adjusting a mirror element of a mirror unit of a motor vehicle, comprising:
providing cooperating surfaces which adjustably connect a mirror holder for supporting the mirror element with a base plate which are configured to be fixedly mounted to said motor vehicle; and
applying a composition comprising particles, wherein the particles positioned close to one of the surfaces are arranged to move to a lesser extent relative to that surface upon a high-frequency pivoting of the cooperating surfaces than particles further removed from that surface.

18. The method according to claim 17, wherein the particles are arranged to generate friction between the particles and the cooperating surfaces upon a high-frequency pivoting of the cooperating surfaces.

19. The method according to claim 17, wherein the composition comprises a metal salt of a fatty acid.

20. The method according to claim 17, wherein the composition is applied directly onto the cooperating surfaces.

21. A method for assembling a mirror adjustment mechanism for adjusting a mirror element of a mirror unit of a motor vehicle, comprising:
providing cooperating surfaces which adjustably connect a mirror holder for supporting the mirror element with a base plate which are configured to be fixedly mounted to said motor vehicle; and
applying a composition comprising particles, wherein the particles are arranged to generate friction between the particles and the cooperating surfaces upon a high-frequency pivoting of the cooperating surfaces.

22. The method according to claim 21, wherein the composition comprises a metal salt of a fatty acid.

23. The method according to claim 21, wherein the composition is applied directly onto the cooperating surfaces.

24. A mirror adjustment mechanism for adjusting a mirror element of a mirror unit of a motor vehicle, the mechanism comprising:
a base plate configured to be fixedly mounted to said motor vehicle;
a mirror holder for supporting said mirror element, the mirror holder being adjustably connected to the base plate via cooperating surfaces; and
a composition comprising particles on the cooperating surfaces, wherein the particles being positioned close to one of the surfaces are arranged to move to a lesser extent relative to that surface upon a high-frequency pivoting of the cooperating surfaces than particles further removed from that surface.

25. The mechanism according to claim 24, wherein the particles are arranged to generate friction between the particles and the cooperating surfaces upon a high-frequency pivoting of the cooperating surfaces.

26. The mechanism according to claim 24, wherein the composition comprises a metal salt of fatty acid.

27. The mechanism according to claim 24, further including hinge parts, parts of which comprise the cooperating surfaces on which the composition is applied.

28. The mechanism according to claim 24, further including a driving means for adjusting the mirror holder, wherein parts of the driving means comprise the cooperating surfaces on which the composition is applied.

29. The mechanism according to claim 24, wherein a first hinge part is substantially pivotable relative to a second hinge part.

30. The mechanism according to claim 29, wherein the first hinge part comprises a substantially spherical curved holder, and wherein the second hinge part comprises a substantially spherical curved ring or cup.

31. The mechanism according to claim 24, wherein the mirror holder is hingedly mounted, via the cooperating surfaces, to a frame for supporting the mirror unit, and wherein the frame is hingedly mounted to the base plate with the aid of a second hinge mechanism.

32. The mechanism according to claim 24, wherein the mirror holder, via the cooperating surfaces, is directly hingedly connected with the base plate.

33. A mirror adjustment mechanism for adjusting a mirror element of a mirror unit of a motor vehicle, the mechanism comprising:
a base plate configured to be fixedly mounted to said motor vehicle;
a mirror holder for supporting said mirror element, the mirror holder being adjustably connected to the base plate via cooperating surfaces; and
a composition comprising particles on the cooperating surfaces, wherein the particles are arranged to generate friction between the particles and the cooperating surfaces upon a high-frequency pivoting of the cooperating surfaces.

34. The mechanism according to claim 33, wherein the composition comprises a metal salt of fatty acid.

35. The mechanism according to claim 33, further including hinge parts, parts of which comprise the cooperating surfaces on which the composition is applied.

36. The mechanism according to claim 33, further including a driving means for adjusting the mirror holder, wherein parts of the driving means comprise the cooperating surfaces on which the composition is applied.

37. The mechanism according to claim 33, wherein a first hinge part is substantially pivotable relative to a second hinge part.

38. The mechanism according to claim 37, wherein the first hinge part comprises a substantially spherical curved holder, and wherein the second hinge part comprises a substantially spherical curved ring or cup.

39. The mechanism according to claim 33, wherein the mirror holder is hingedly mounted, via the cooperating surfaces, to a frame for supporting the mirror unit, and wherein the frame is hingedly mounted to the base plate with the aid of a second hinge mechanism.

40. The mechanism according to claim 33, wherein the mirror holder, via the cooperating surfaces, is directly hingedly connected with the base plate.

* * * * *

UNITED STATES PATENT AND TRADEMARK OFFICE
CERTIFICATE OF CORRECTION

| | | |
|---|---|---|
| PATENT NO. | : 8,201,799 B2 | |
| APPLICATION NO. | : 10/599650 | |
| DATED | : June 19, 2012 | |
| INVENTOR(S) | : Stefan Frits Brouwer, Marius Brand and Rudolf Pieter Hoogenboom | |

It is certified that error appears in the above-identified patent and that said Letters Patent is hereby corrected as shown below:

On the title page Item (75) Inventors: "Amerspoort" should be -- Amersfoort --

Signed and Sealed this
Thirty-first Day of July, 2012

David J. Kappos
*Director of the United States Patent and Trademark Office*